Patented Dec. 9, 1941

2,265,299

UNITED STATES PATENT OFFICE 2,265,299

MANUFACTURE OF 1,1' DITHIO BIS ARYL-THIAZOLES

William E. Messer, Cheshire, Conn., assignor to United States Rubber Company, New York, N. Y., a corporation of New Jersey No Drawing. Application September 13, 1939, Serial No. 294,706

3 Claims. (Cl. 260—306)

This invention relates to a method of preparing relatively pure 1,1'-dithio bis aryl thiazoles.

It has been found that chlorine will oxidize an alcoholic solution of 1-mercapto benzo thiazole or its alkali metal salts giving the disulphide which is essentially insoluble in alcohol and may be filtered off, washed and dried.

The alcoholic filtrates may be neutralized if necessary, as with dry ammonia, and distilled to recover approximately 85% of the alcohol used.

In contradistinction, benzene, carbon tetrachloride, etc. solutions of the mercapto compound are oxidized by chlorine to the disulphide but neither the yield, quality of product, nor the economy, compares with the use of alcohol. Other alcohols than ordinary denatured alcohol may be used but the preferred alcohols are methyl, ethyl, and isopropyl alcohols because of their similar solvent power and cheapness.

The following examples illustrate the invention:

Example 1

A solution of 50 parts by weight of crude 1-mercapto benzo thiazole and 470 parts by weight of denatured alcohol are brought to a boil and the solution filtered. The filtrate is agitated and cooled to 3° C. in a flask cooled with ice. Chlorine is led into or over this liquid until some 11 parts by weight of chlorine has been absorbed and a white precipitate forms, keeping the temperature below about 10° C. This precipitate is filtered off and the cake washed with about 160 parts of alcohol. The alcoholic filtrates are barely neutralized with dry ammonia (some 10–12 parts) and distilled recovering alcohol. The precipitate is then washed thoroughly with water and alcohol is recovered from the filtrate by fractionation. In all about 85% of the alcohol used is recovered. About 42 parts by weight of 1,1'-dithio bis benzo thiazole as a white powder melting at about 155–160° C. are obtained.

Example 2

About 57 parts of dry sodium salt of 1-mercapto benzo thiazole or 50 parts of 1-mercapto benzo thiazole and 12 parts of sodium hydroxide are dissolved in about 470 parts by weight of denatured alcohol and the solution is filtered. The filtrate is agitated and cooled to about 3° C. and then chlorine is passed in over the liquid until 10-11 parts by weight have been absorbed. The resultant slurry is filtered and the precipitate washed with about 160 parts of alcohol. The alcoholic filtrates, etc., are treated to recover alcohol as in Example 1. The precipitate is washed thoroughly with water and dried. Some 38 parts of 1,1'-dithio bis benzo thiazole of melting range about 166–170° C. are obtained. The product is a white powder.

The process may be applied to the oxidation of other corresponding arylene thiazyl sulphides of the benzene or naphthalene series.

Having thus described my invention, what I claim and desire to protect by Letters Patent is:

1. A process of preparing 1,1' dithio bis arylene thiazoles which comprises oxidizing in the cold an alcoholic solution of an arylene thiazyl sulphide which is soluble either in alcohol or alcoholic sodium hydroxide, by introducing into the cooled alcoholic solution at a temperature below 10° C., chlorine gas, the arylene radical being an aromatic hydrocarbon radical selected from the group consisting of the benzene, and naphthalene series.

2. A process of preparing 1,1' dithio bis arylene thiazoles which comprises oxidizing in the cold an alcoholic solution of an alkali-metal salt of mercapto benzo thiazole which is soluble either in alcohol or alcoholic sodium hydroxide, by introducing into the cooled alcoholic solution at a temperature below 10° C., chlorine gas.

3. A process of preparing 1,1' dithio bis benzo thiazole which comprises introducing at a temperature below 10° C., chlorine gas into a cooled alcoholic solution of a compound having the formula

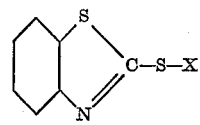

where X is hydrogen or an alkali-metal.

WILLIAM E. MESSER.